(12) United States Patent
Broxton et al.

(10) Patent No.: US 10,089,635 B1
(45) Date of Patent: Oct. 2, 2018

(54) PRESENTING VIDEO VIEW DATA

(75) Inventors: Thomas J. Broxton, San Francisco, CA (US); Baljeet Singh, San Francisco, CA (US); Tomasz Kokoszka, Zurich (CH); Lane P. Shackleton, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 1844 days.

(21) Appl. No.: 13/242,486

(22) Filed: Sep. 23, 2011

(51) Int. Cl.
G06Q 30/02 (2012.01)

(52) U.S. Cl.
CPC ......... *G06Q 30/02* (2013.01); *G06Q 30/0201* (2013.01)

(58) Field of Classification Search
CPC .................................................. G06Q 30/02
USPC .......................................................... 705/14
See application file for complete search history.

(56) References Cited

U.S. PATENT DOCUMENTS

| | | | |
|---|---|---|---|
| 7,117,439 B2 | 10/2006 | Barrett et al. | |
| 7,984,466 B2 | 7/2011 | Eldering et al. | |
| 8,160,923 B2 | 4/2012 | Taylor et al. | |
| 2007/0198327 A1 | 8/2007 | Yazdani et al. | |

OTHER PUBLICATIONS

Dreier, Troy "Understanding YouTube Hot Spots", Aug. 2, 2010, www.onlinevideo.net/2010/08/understanding-youtube-hot-spots/.*

Schwartz, Barry "YouTube Adds Search Suggestions, Demographics Stats, Google Contacts Import & More", May 19, 2008, www.searchengineland.com, http://searchengineland.com/youtube-adds-search-suggestions-demographic-stats-google-contacts-import-more-14025.*
Elliott, Amy-Mae "YouTube Improves Video Analytics for Partners With New Tools", Apr. 20, 2011, www.mashable.com, http://mashable.com/2011/04/20/youtube-new-partner-analytics/.*
Rivas, Manny "Tracking Results: YouTube Analytics Fundamentals", Sep. 4, 2009, Aim Clear Blog, http://www.aimclearblog.com/2009/08/04/make-videos-pay-youtube-analytics-fundamentals/ retrieved on Nov. 27, 2015.*
Gillis, Jeff "A deeper look at Advanced Segmentation: Filtering on the fly—Analytics Blog", Nov. 14, 2008, Google Analytics Blog, http://analytics.blogspot.com/2008/11/deeper-look-at-advanced-segmentation.html retrieved on Nov. 27, 2015.*
Elleston, Tim, Aug. 25, 2011, Digital Balance, http://www.digitalbalance.com.au/our-blog/brightcove-video-in-sitecatalyst-15/?nk=5795f2b067f195795f2b067fe1 retrieved on Jul. 24, 2016.*
'Wikipedia' [online]. "Video advertising," 2010, [retrieved on Jul. 2, 2012]. Retrieved from the Internet: URL: http://web.archive.org/web/20110226144105/http://en.wikipedia.org/wiki/Video_advertising. 1 page.

* cited by examiner

*Primary Examiner* — Patricia H Munson
(74) *Attorney, Agent, or Firm* — Lowenstein Sandler LLP

(57) ABSTRACT

Methods, systems, and apparatus, including computer programs encoded on a computer-readable storage medium, for presenting view data. A method includes identifying view data indicative of a number of presentations of a plurality of video content items at user devices associated with a campaign; identifying a plurality of segments of the view data where a segment defines a portion of the view data in accordance with a filter criteria; and providing data that cause presentation of a report interface that includes a segmentation control, a view data graph, and a video content item list.

19 Claims, 10 Drawing Sheets

PRESENTING VIDEO VIEW DATA

BACKGROUND

This specification relates to video content.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for presenting view data. The method comprises: identifying view data indicative of a number of presentations of a plurality of video content items at user devices associated with a campaign; identifying a plurality of segments of the view data where a segment defines a portion of the view data in accordance with a filter criteria; and providing data that cause presentation of a report interface that includes a segmentation control, a view data graph, and a video content item list, where the segmentation control includes a plurality of elements that include at least one element for one or more of the identified segments, the view data graph includes a presentation of a summary of the view data for one or more video content items in the campaign, and the video content item list includes a listing of video content items including a name and view data for the associated video content item.

These and other implementations can each optionally include one or more of the following features. The segmentation control can be a bar and the elements can be tabs on the bar. The filter criteria can enable filtering the view data by demographic segment. The filter criteria can enable filtering the view data by location. The filter criteria can enable filtering the view data by time. The plurality of elements can include two or more elements for the identified segments. The view data graph can include a presentation of a summary of the view data for all video content items in the campaign. The video content item list can include a description of each video content item. The video content item list can include a preview control for previewing an associated video content item. The preview control can include an image selected from a frame of an associated video content item. The method can include receiving a selection of one of the video content items in the video content item list and providing data that cause the presentation of a modified report interface that includes the segmentation control, a view data graph for the selected video content item, and a tabular form of the information in the video content item list associated with the selected video content item. The method can include receiving a selection of one of the elements of the segmentation control and providing data that cause an update to the view data graph to include data for an associated data segment. The selections can be received from a content sponsor associated with the campaign. The method can include providing data that cause an update to the view data presented in the video content item list to include data for an associated data segment. The segments can be selected from the group comprising total views, organic views, views associated with an advertisement, views by a demographic segment, views by location, views by time period, views by dwell time, and views by quartiles associated with dwell time. Providing data that cause presentation of a report interface can include providing data that cause presentation of a video viewer in the report interface. Providing data that cause presentation of the video viewer can include providing data that cause presentation of a portion of the video content item within the video viewer. The view data can include quartile view data for videos viewed by dwell time in terms of percentage of a video content item viewed.

In general, another innovative aspect of the subject matter described in this specification can be implemented in methods that include a method for presenting view data. The method comprises: identifying view data indicative of a number of presentations of a plurality of video content items at user devices associated with a campaign; identifying a plurality of segments of the view data where a segment defines a portion of the view data in accordance with a filter criteria; providing data that cause presentation of a report interface that includes a segmentation control and a view data graph, where the segmentation control includes a plurality of elements that include at least one element for one or more of the identified segments, and the view data graph includes a presentation of a summary of the performance for one or more video content items in the campaign; receiving a selection of one of the elements of the segmentation control; and providing data that cause an update to the view data graph to include data for an associated data segment.

In general, another innovative aspect of the subject matter described in this specification can be implemented in computer program products which include a computer program product embodied in a tangible medium that when executed by a processor cause the processor to: identify view data indicative of a number of presentations of a plurality of video content items at user devices associated with a campaign; identify a plurality of segments of the view data where a segment defines a portion of the view data in accordance with a filter criteria; provide data that cause presentation of a report interface that includes a segmentation control and a view data graph, where the segmentation control includes a plurality of elements that include at least one element for one or more of the identified segments, and the view data graph includes a presentation of a summary of the performance for one or more video content items in the campaign; receive a selection of one of the elements of the segmentation control; and provide data that cause an update to the view data graph to include data for an associated data segment.

In general, another innovative aspect of the subject matter described in this specification can be implemented in systems which include a system for presenting view data. The system comprises: a content management system that provides content items responsive to received requests; a view analysis apparatus that tracks presentations of video content items, identifies view data indicative of a number of presentations of a plurality of video content items at user devices associated with a campaign, identifies a plurality of segments of the view data where a segment defines a portion of the view data in accordance with a filter criteria; and a report interface, that is displayable on a user device, that includes a segmentation control and a view data graph, where the segmentation control includes a plurality of elements that include at least one element for one or more of the identified segments, the view data graph includes a presentation of a summary of the performance for one or more video content items in the campaign, and the report interface is configured, upon receiving a selection of one of the elements of the segmentation control, to update the view data graph to include data for an associated data segment.

Particular implementations may realize one or more of the following advantages. View data for video content items included in a campaign can be viewed, including summary data, data for a particular video content item, and data corresponding to a particular segment of the view data. A campaign sponsor can filter view data for video content items in a campaign by various segments, including, for example, total views, organic views, views associated with an advertisement, views by a demographic segment, views by location, views by time period, views by dwell time, or views by quartiles associated with dwell time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

View data corresponding to presentations of one or more video content items associated with a campaign can be identified. One or more segments of the view data can be identified, where a segment defines a portion of the view data in accordance with a filter criteria. The filter criteria can enable the view data to be filtered, for example, by demographic segment, location, or time. A report interface can be displayed that includes in some implementations a segmentation control, a view data graph, and a video content item list. The view data graph can include a presentation of a summary of the view data for one or more video content items in the campaign and the video content item list can include a listing of video content items and associated data, such as a name and view data, for each respective video content item. The segmentation control can be of the form of a bar and can include a set of elements (e.g., tabs), where each element can correspond to a respective segment. In response to user selection of an element, the view data graph and the video content item list can be updated to show information associated with the segment corresponding to the selected element.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined. As another example, if the number of data items stored for a particular user is less than a predetermined threshold, then certain information (e.g., demographic, geographic) may not be used for the user.

Figure 1:
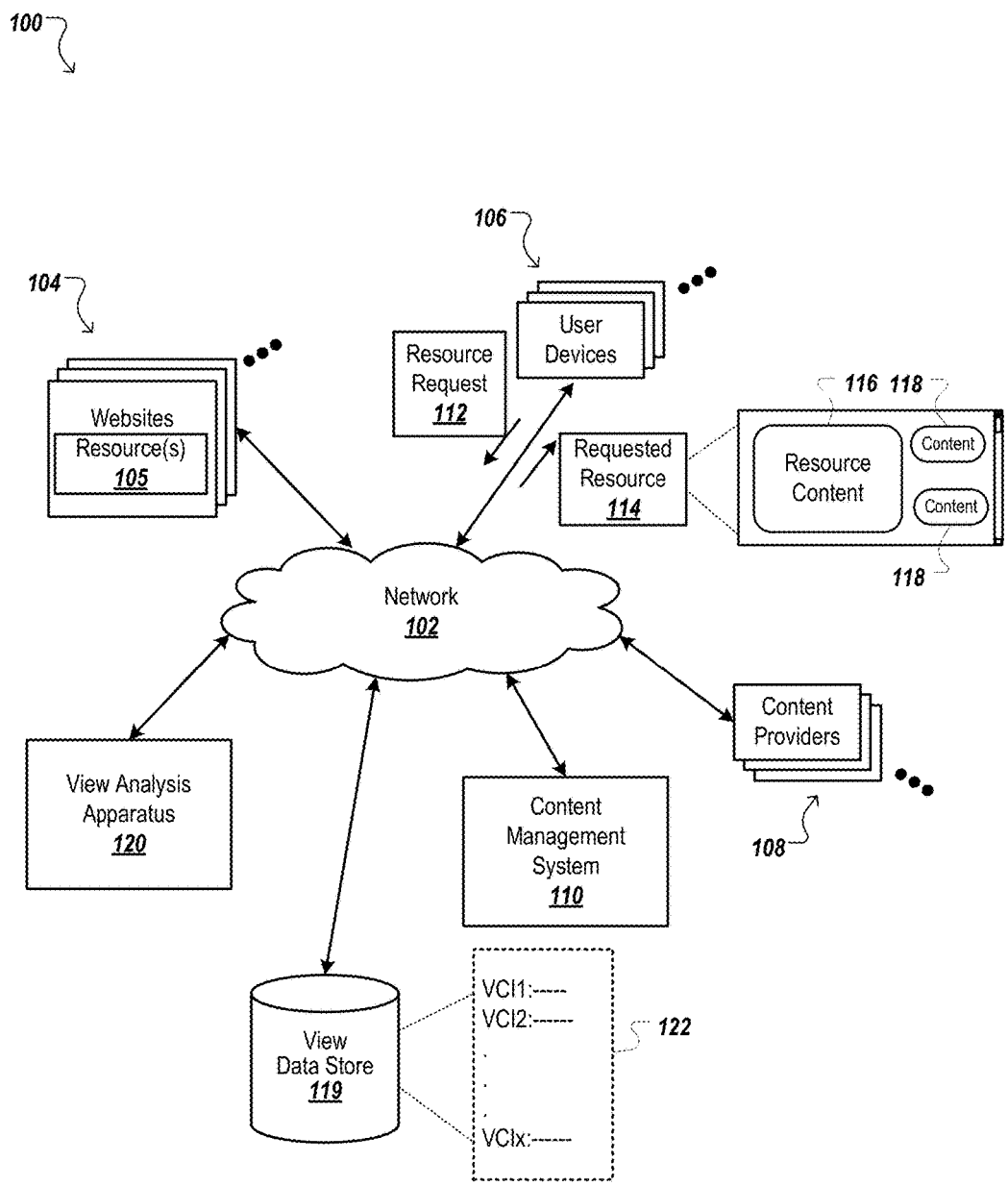
FIG. 1 is a block diagram of an example environment for content management.

FIG. 1 is a block diagram of an example environment 100 for content management. The example environment 100 includes a network 102, such as a local area network (LAN), a wide area network (WAN), the Internet, or a combination thereof. The network 102 connects websites 104, user devices 106, content providers 108, and the content management system 110. The example environment 100 may include many thousands of websites 104, user devices 106, and content providers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, videos, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a search results page in which search results are presented, or another resource 105. The data representing the requested resource 114 can include data that cause presentation of resource content 116 at the user device including the display of content in one or more content slots 118.

As noted above, content slots 118 can be defined in a search results page. The search results page can be, for example, a general search results page that is presented in response to a general search query that is submitted to a general purpose search system (e.g., a search system that identifies resources of several different resource types). The search results page can also be, for example, a search results page that is presented in response to a search query that is submitted to a video content item search engine (e.g., a search system that identifies video content items that are responsive to the search query). Unless otherwise specified, the term "search results page" is intended to include both general search results pages as well as search results pages that present search results for pre-specified types of resources (e.g., video resources).

When a resource 105 is requested by a user device 106, the content management system 110 receives a request for content to be provided with the requested resource 114. The request for content can include characteristics of the content slots 118 that are defined for the requested resource 114, and can be provided to the content management system 110.

For example, a reference (e.g., URL) to the requested resource 114 for which the content slot is defined, a size of the content slot, and/or media types that are eligible for presentation in the content slot can be provided to the content management system 110. Similarly, keywords associated with a requested resource ("resource keywords") can also be provided to the content management system 110 to facilitate identification of content items that are relevant to the requested resource 114.

Based on data included in the request for content, the content management system 110 selects one or more content items that are eligible to be provided in response to the request ("eligible content items"). For example, eligible content items can include content items having characteristics matching the characteristics of the content slots 118 and that are identified as relevant to specified resource keywords. In some implementations, content items having targeting keywords that match the resource keywords are selected as eligible content items by the content management system 110.

The eligible content items can include video content items. Video content items can include, for example, video content items that have been created exclusively for presentation in content slots 118 or other video content items that have been identified, by a content provider 108, as being available for presentation in content slots 118 as well as being available in other viewing environments, such as online video sharing sites in which many different types of video content items may be presented (e.g., user provided videos).

A content provider 108 can create or edit a content campaign associated with one or more video content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

Content providers 108 (as well as other owners or publishers of video content items) may be interested in evaluating the performance of their video content items. Accordingly, the environment 100 includes a view analysis apparatus 120 that tracks presentations of video content items and provides information to the content providers 108 so that the content providers 108 can evaluate their video content items. The view analysis apparatus 120 is depicted as being implemented independent of the content management system 110, but can also be implemented entirely, or in part, in the content management system 110.

In some implementations, the view analysis apparatus 120 tracks presentations of video content items (e.g., VCIa-VCIx) and logs view data 122 for the video content items in a view data store 119. The view data 122 for each video content item can be indexed according to (and/or stored with a reference to) the video content item with which the view data 122 is associated. The view analysis apparatus 120 can use the view data 122 for each of the video content items to provide content providers 108 (or other video content owners or publishers) with information that facilitates evaluation of the performance of the video content items. In some implementations, the view analysis apparatus 120 can use the view data 122 for a particular video content item (e.g., VCI2) to determine a number of viewers that requested presentation (e.g., selected) or initiated play of the video content item.

In some implementations, a report interface can be displayed that includes a segmentation control (e.g., a segmentation bar as shown in the figures), a view data graph, and a video content item list. The view data graph can include a presentation of a summary of the view data for the video content items in a campaign and the video content item list can include a listing of the video content items and associated data, such as a name and view data, for each respective video content item. The content provider 108 can select one or more video content items in the video content item list. The content management system 110 can identify view data 122 that is associated with the selected video content items. The view data graph and the video content item list can be updated to show information associated with the selected video content items.

The segmentation control can include a set of elements (e.g., tabs on the bar), where each element can correspond to a respective segment. A segment defines a portion of the view data 122 in accordance with a filter criteria. The filter criteria can enable the view data 122 to be filtered, for example, by demographic segment, location, or time. Segments can include, for example, total views, organic views, views associated with an advertisement (e.g., paid views), views by a demographic segment, views by location, views by time period, views by dwell time, or views by quartiles associated with dwell time. In response to user selection of an element, the view data graph and the video content item list can be updated to show information associated with the segment corresponding to the selected element.

Figure 2:
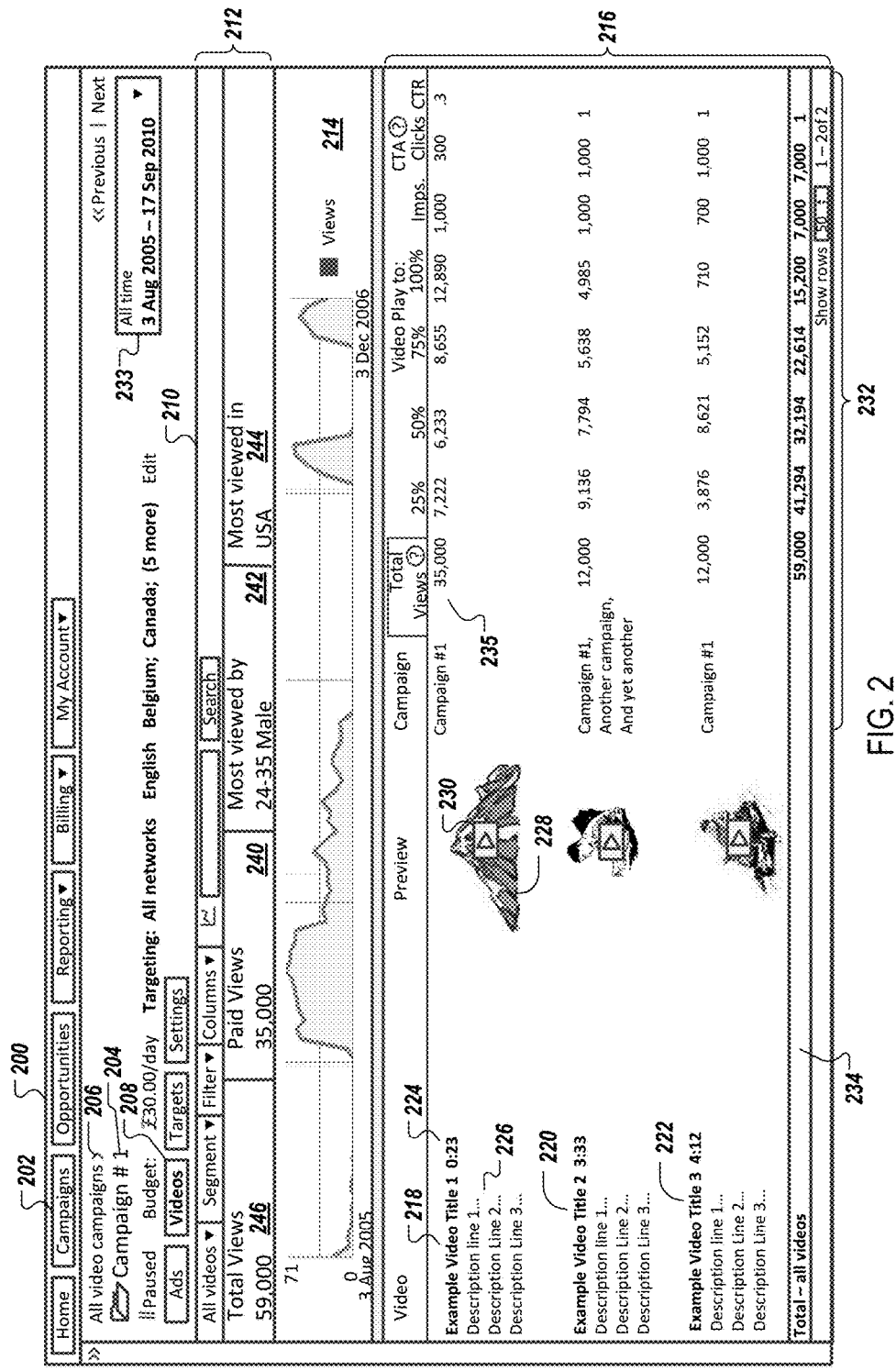
FIGS. 2-7 illustrate example user interfaces.

FIG. 2 illustrates an example user interface 200 for displaying campaign information. The user interface 200 can be used, for example, by a campaign sponsor. The campaign sponsor can select a campaigns control 202 to view information about created campaigns. As indicated by labels 204 and 206, respectively, the campaign sponsor can navigate to a campaign with a name of "campaign #1", which is a video campaign. The campaign sponsor can view information about videos included in the campaign by selecting a videos control 208.

In response to selecting the videos control 208, a report interface 210 can be displayed. The report interface 210 includes a segmentation bar 212, a view data graph 214, and a video content item list 216. The video content item list 216 includes a listing of video content items 218, 220, and 222.

For each video content item 218, 220, and 220, the video content items list 216 includes a name, a description, a video length, associated view data, and a preview control. For example, for the video content item 218, the video content item list 216 includes a video length 224, a description 226, and a preview control 228. The preview control 228 can include, for example, an image selected from a frame of the video content item 218. The preview control 228 includes a control 230, which can be selected to preview a portion (or all) of the video content item 218.

A table 232 displays view data for the video content items 218, 220, and 222. The view data can correspond to presentations of the video content items 218, 220, and 222 at user devices associated with the "campaign #1" campaign. The table 232 can display view data corresponding to a date range selected using a control 233. A totals row 234 displays view data totals for the video content items 218, 220, and 222.

The view data can include information on total views and can include information relating to content items (e.g., advertisements) that are displayed in association with a video content item, such as impressions, clicks, and click through rate (CTR). For example, as shown in a row 235 that corresponds to the video content item 218, the video content item 218 had thirty five thousand total views, one thousand associated impressions, three hundred clicks, and a click through rate of thirty percent. The view data can also include quartile view data for videos viewed by dwell time in terms of percentage of a video content item viewed. For example, as shown in the row 235, 12,890 of the total 35,000 total views of the video content item 218 are views of one hundred percent of the video content item 218 and 7,222 of the total views are views where only the first 25% of the video content item 218 was watched.

The segmentation bar 212 includes tabs 240-246, where the tabs 240, 242, and 244 each correspond to a particular segment of the view data. A segment defines a portion of the view data in accordance with a filter criteria, where the filter criteria can enable filtering the view data, for example, by demographic segment, location, or time. For example, the tab 240 corresponds to a paid views segment, the tab 242 corresponds to a twenty four to thirty five year old male viewer segment, and the tab 244 corresponds to a United States viewer segment. Other types of segments can be identified, including views by time period, views by dwell time, and views by quartiles associated with dwell time, to name a few examples. As described in more detail below, one of the tabs 240-244 can be selected to cause an update to the report interface 210 to include data for an associated segment.

The view data graph 214 includes a presentation of a summary of view data for one or more of the video content items in the "campaign #1" campaign. For example, the view data graph 214 currently shows information for total views for the video content items 218, 220, and 222. The campaign sponsor can select a particular video content item 218, 220, or 222, and in response, a modified report interface 210 can be displayed.

Figure 3:
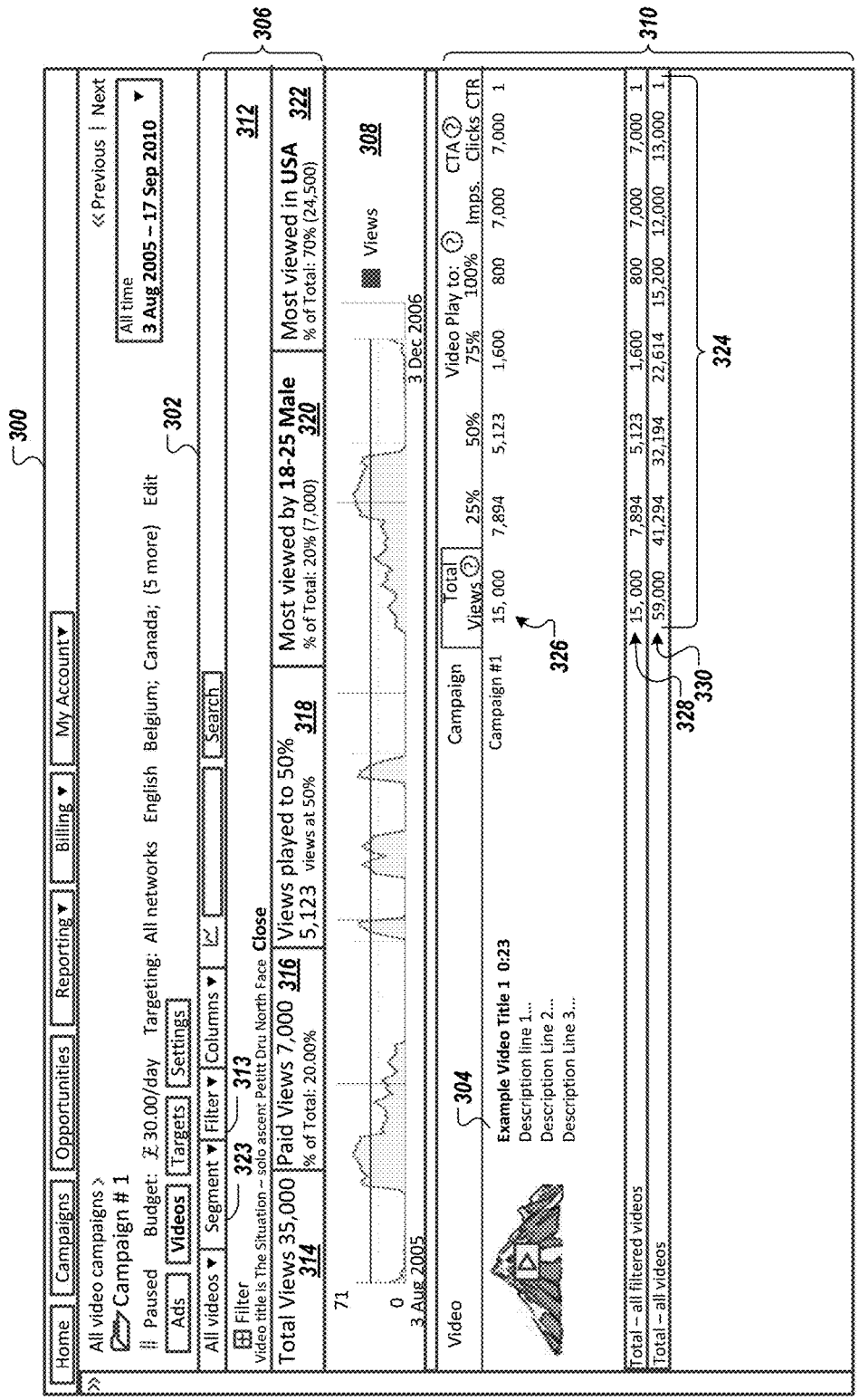

For example, FIG. 3 illustrates an example user interface 300 that includes a report interface 302. The report interface 302 can be displayed in response to selection of the video content item 218 (e.g., the video content item 218 can be represented in the report interface 302 as a video content item 304). The report interface 302 includes a segmentation bar 306, a view data graph 308, and a video content item area 310.

The video content item area 310 includes a table 324 which includes a row 326 which includes information for view data associated with the video content item 304. The table 324 includes a row 328 which includes totals for all filtered video content items (which, in this example, includes information for the one video content item 304). The table 324 also includes a row 330 which includes information for all video content items included in the "campaign #1" campaign.

The view data graph 308 includes a presentation of a summary of the view data for the video content item 304 (e.g., views occurring on particular dates). The segmentation bar 306 includes a filter bar 312 which indicates that the information presented in the report interface 302 is filtered to include information associated with the video content item 304. The campaign sponsor can apply other filters using a filters control 313.

The segmentation bar 306 includes tabs 314-322 where each tab 314-322 is associated with a respective segment. In some implementations, some or all of the segments available from the tabs 314-322 (and possibly other segments) are available using a segments control 323. Some or all of the tabs 314-322 can include information which indicates a percentage of views and/or a count of views that are associated with the segment that is associated with the respective tab. For example, the tab 316, which corresponds to a paid views segment, indicates that 7,000 (twenty percent) of the 35,000 total views of the video content item 304 are paid views. As another example, the tab 322 indicates that seventy percent (e.g., 24,500) of the 35,000 total views of the video content item 304 were viewed in the United States. The campaign sponsor can select one of the tabs 316-322 to cause an update to the report interface 302 to include data for an associated segment.

Figure 4:
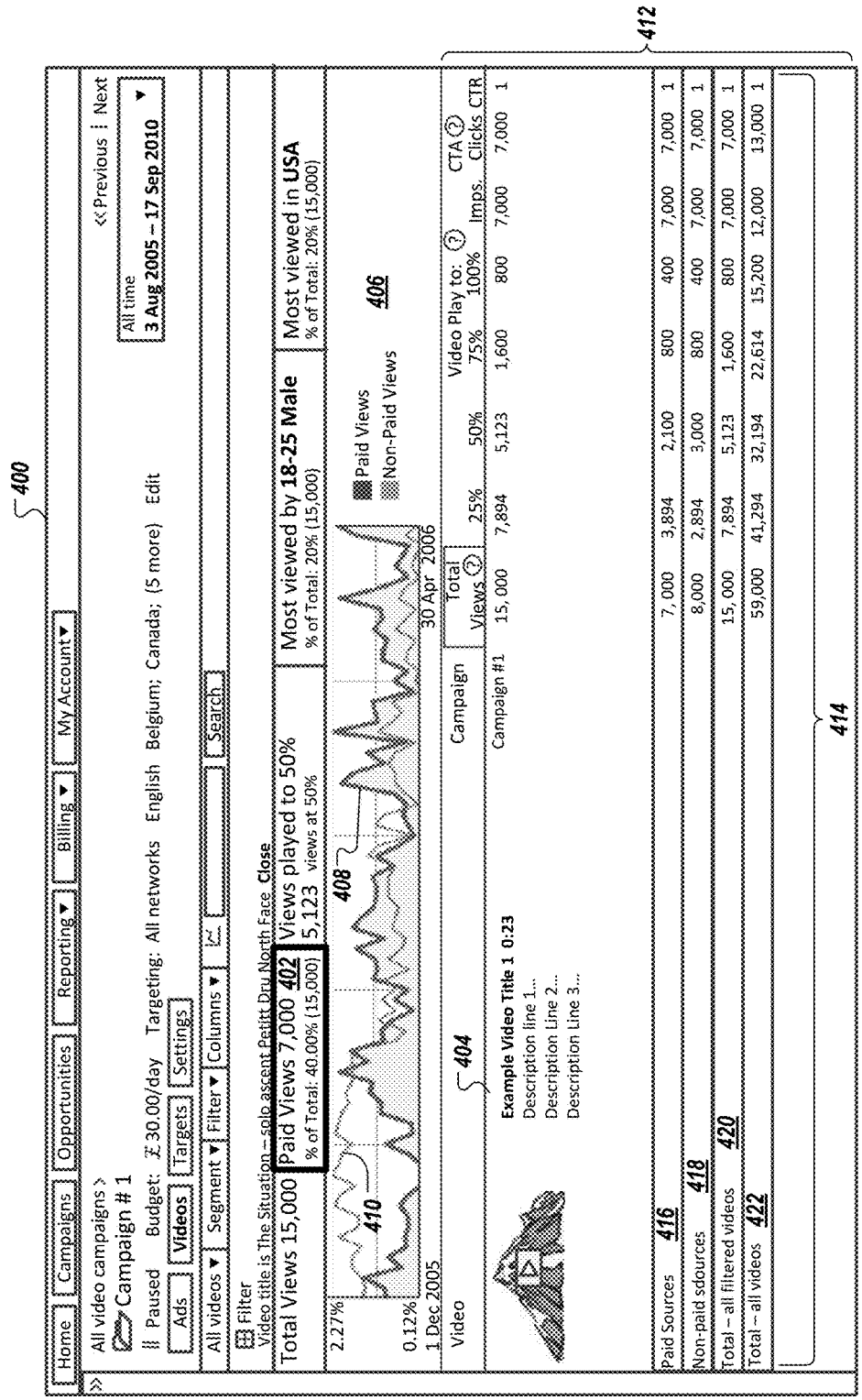

For example, FIG. 4 illustrates an example user interface 400 which can be displayed in response to selection of a tab 402 corresponding to a paid views segment associated with a video content item 404. In response to selection of the tab 402, a view data graph 406 can be updated to include data for the paid views segment. For example, the view data graph 406 shows data 408 corresponding to the paid views segment and data 410 corresponding to an unpaid views segment.

A video content item area 412 can also be updated in response to selection of the tab 402 to include data for the paid views segment. For example, the video content item area 412 can be updated to include a table 414. The table 414 includes rows 416, 418, 420, and 422 corresponding to view data for paid sources, non-paid sources, filtered video content items, and all video content items, respectively.

Figure 5:
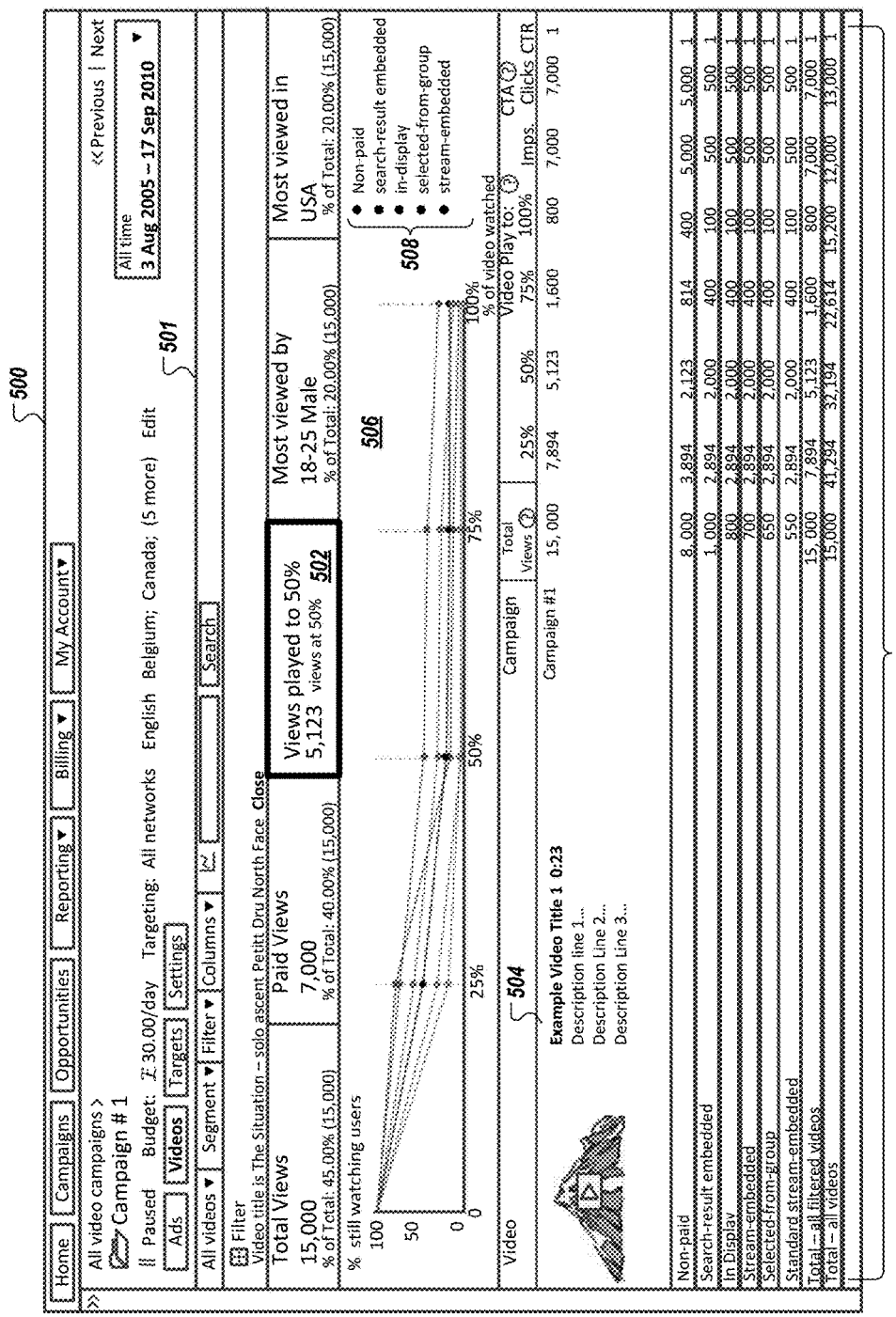

As another example, FIG. 5 illustrates an example user interface 500 which includes a report interface 501 which can be displayed in response to selection of a tab 502 corresponding to a views-played-to segment associated with a video content item 504. In response to selection of the tab 502, a view data graph 506 can be displayed which displays view data according to a percentage of the video content item 504 watched. As indicated by a legend 508, the view data graph 506 can show data corresponding to various display formats, such as non-paid, search-result embedded, in-display, selected-from-group, and stream-embedded formats. A table 510 can be displayed which shows, among other information, tabular data for various display formats and various viewed-to quartile thresholds (e.g., 25%, 50%, 75%, and 100%).

Figure 6:
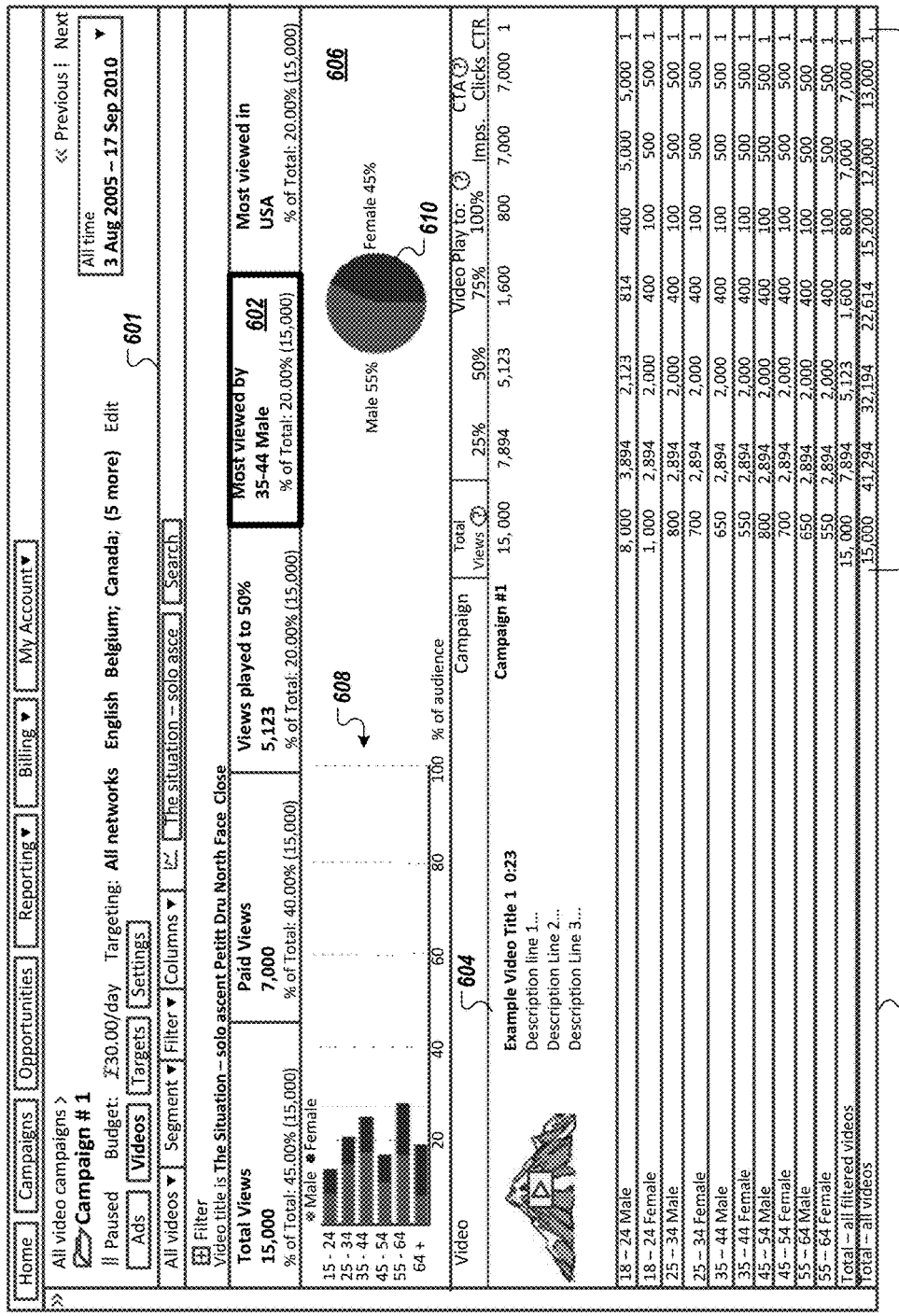

FIG. 6 illustrates an example user interface 600 which includes a report interface 601 which can be displayed in response to selection of a tab 602 corresponding to a viewed-by segment associated with a video content item 604. In response to selection of the tab 602, a view data graph 606 can be displayed which includes a bar chart 608 and a pie chart 610. The bar chart 608 displays an audience breakdown by age group (e.g., 15-24, 25-34, 35-44, 45-54, 55-64, 65+) and by gender. The pie chart 610 displays an audience breakdown by gender (e.g., fifty five percent of viewers are male and forty five percent of viewers are female). In response to selection of the tab 602, a table 612 can be displayed which shows view count and quartile view data for various age and gender audience segments.

Figure 7:
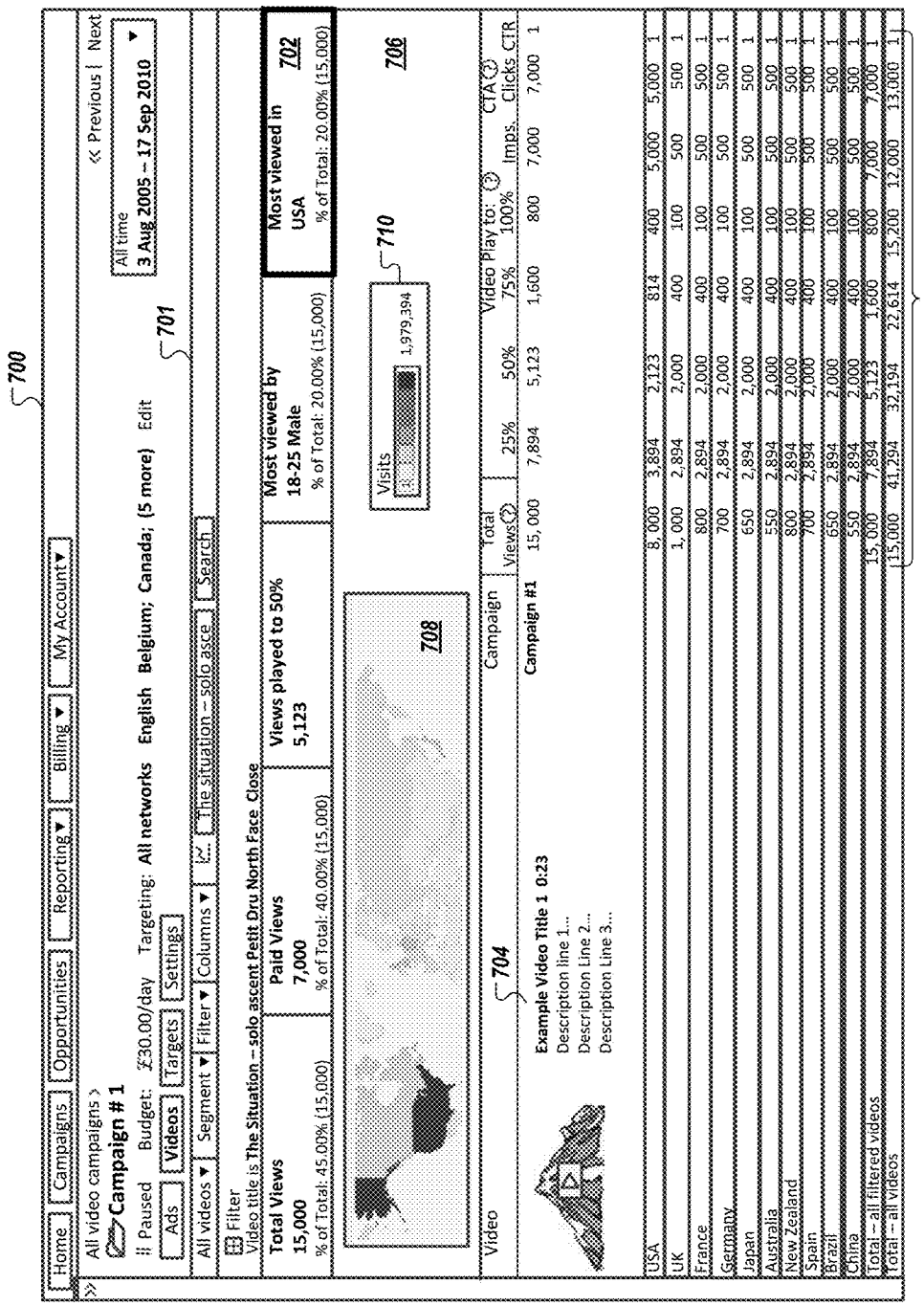

FIG. 7 illustrates an example user interface 700 which includes a report interface 701 which can be displayed in response to selection of a tab 702 corresponding to a viewed-in segment associated with a video content item 704. In response to selection of the tab 702, a view data graph 706 can be displayed which includes a map 708 and a legend 710. The map 708 displays one or more geographical areas in which the video content item 704 was viewed. The geographical areas are colored in the map 708 according to view count. For example, as indicated by the legend 710, darker geographical areas can correspond to geographical areas where more views of the video content item 704 occurred. In response to selection of the tab 702, a table 712 can be displayed which shows view count and quartile view information for various geographical areas.

Figure 8:
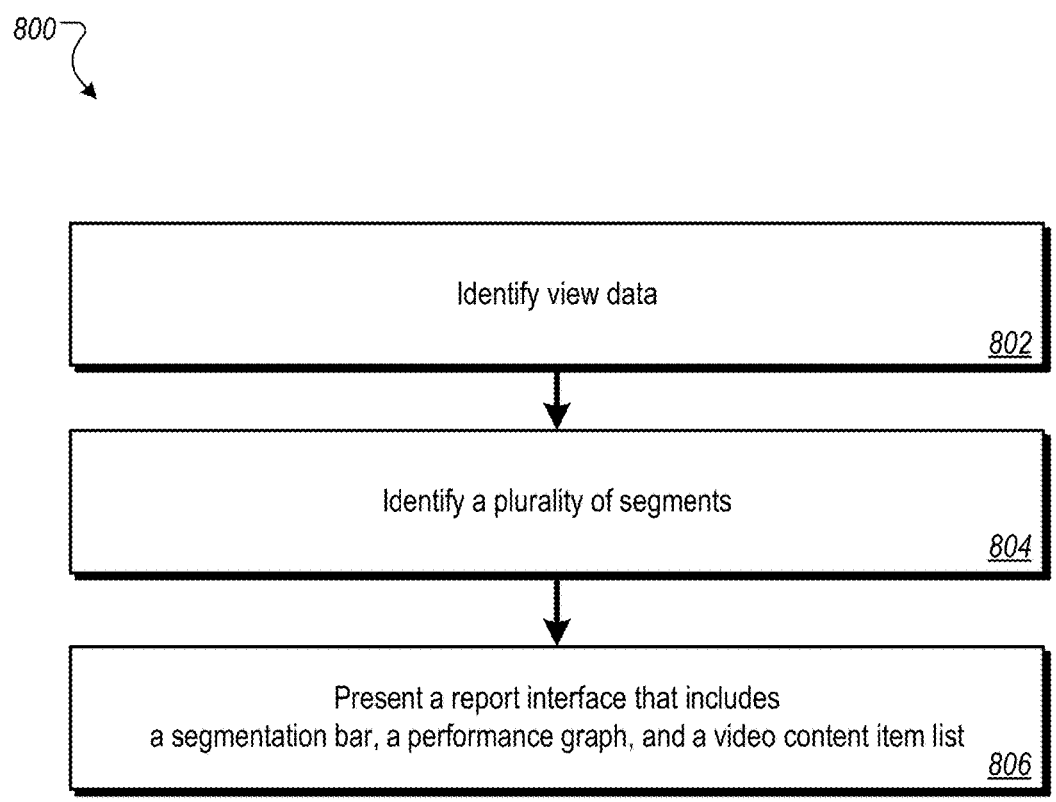
FIG. 8 is a flowchart of an example process for presenting a report interface.

FIG. 8 is a flowchart of an example process 800 for presenting a report interface. The process 800 can be performed, for example, by the content management system 110 described above with respect to FIG. 1.

View data indicative of a number of presentations of a plurality of video content items at user devices associated with a campaign is identified (802). For example, the view data 122 that is indicative of a number of presentations of the video content items VCI1, VCI2, . . . , and VCIX can be obtained from the view data store 119. As another example, view data corresponding to the video content items 218, 220, and 222 described above with respect to FIG. 2 can be identified.

A plurality of segments of the view data is identified (804), where a segment defines a portion of the view data in accordance with a filter criteria. The filter criteria can enable filtering the view data by demographic segment, location, or time, to name a few examples. Segments can include, for example, total views, organic views, views associated with advertisements (e.g., paid views), views by a demographic segment, views by location, views by time period, views by dwell time, or views by quartiles associated with dwell time.

Data is provided that cause presentation of a report interface that includes, in some implementations, a segmentation control, a view data graph, and a video content item list (806). The segmentation control can include a plurality of elements that include at least one element for one or more of the identified segments. The view data graph can include a presentation of a summary of the view data for one or more video content items in the campaign. The video content item list can include a listing of video content items including a name and view data for the associated video content item. For example, with respect to FIG. 2, the report interface 210 can be presented, where the report interface 210 includes the segmentation bar 212, the view data graph 214, and the video content item list 216.

In some implementations, the video content item list can include a description of each video content item included in the list. For example, with respect to FIG. 2, the video content item list 216 includes a description 226 for the video content item 218. The video content item list can include a preview control for previewing an associated video content item and the preview control can include an image selected from a frame of an associated video content item. For example, the video content item list 216 includes a preview control 228 for the video content item 218. In response to selection of the preview control, data can be provided that cause presentation of a video viewer in the report interface. The video viewer can present all or a portion of the video content item.

The video content item list and the view data graph can each include information for all video content items in the campaign, a subset of two or more of the video content items in the campaign, or a single video content item in the campaign. For example, with respect to FIG. 2, the view data graph 214 and the video content item list 216 each include information for all videos included in the "campaign #1" campaign. As another example, with respect to FIG. 3, the view data graph 308 and the video content item list 310 each include information associated with the selected video content item 304. For example, the selection of the video content item 218 presented in the video content item list 216 can be received (e.g., from a content sponsor) and data can be provided that cause the presentation of the report interface 302, where the view data graph 308 included in the report interface 302 is for the selected video content item 218 and a tabular form of the information in the video content item list 216 associated with the selected video content item 218 is displayed in the updated video content item list 310.

The video content item list and the view data graph can each present information associated with all views of the videos for which information is presented or can present information for a portion of the view data as defined by one or more segments. For example, a selection of one of the elements of the segmentation control can be received (e.g., from a content sponsor) and data can be provided that cause an update to the view data graph to include data for an associated segment and an update to the view data presented in the video content item list to include data for the associated segment. For example, with respect to FIG. 4, a selection of the tab 403 can be received, and the view data graph 406 and the video content item list 412 can be updated to include data for the associated paid views segment.

Figure 9:
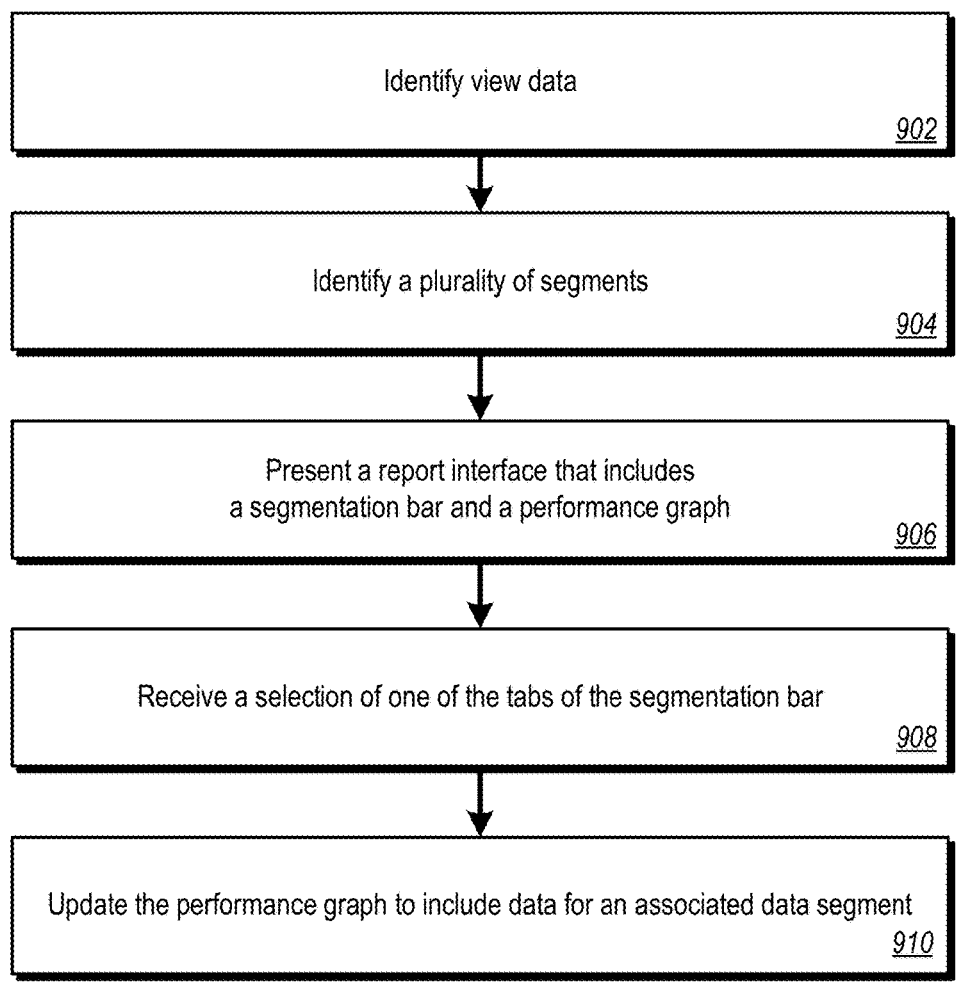
FIG. 9 is a flowchart of an example process for presenting video view data.

FIG. 9 is a flowchart of an example process 900 for presenting video view data. The process 900 can be performed, for example, by the content management system 110 described above with respect to FIG. 1.

View data indicative of a number of presentations of a plurality of video content items at user devices associated with a campaign is identified (902). For example, the view data 122 that is indicative of a number of presentations of the video content items VCI1, VCI2, . . . , and VCIX can be obtained from the view data store 119. As another example, view data corresponding to the video content items 218, 220, and 222 described above with respect to FIG. 2 can be identified.

A plurality of segments of the view data are identified (904), where a segment defines a portion of the view data in accordance with a filter criteria. The filter criteria can enable filtering the view data by demographic segment, location, or time, to name a few examples. Segments can include, for example, total views, organic views, paid views, views by a demographic segment, views by location, views by time period, views by dwell time, or views by quartiles associated with dwell time.

Data is provided that cause presentation of a report interface that includes a segmentation control and a view data graph (906), where the segmentation control includes a plurality of elements that include at least one element for one or more of the identified segments, and the view data graph includes a presentation of a summary of the view data for one or more video content items in the campaign. For example, with respect to FIG. 2, the report interface 210 can be presented, where the report interface 210 includes the segmentation bar 212 and the view data graph 214 and where the segmentation bar 212 includes the tabs 240-246.

A selection of one of the elements of the segmentation control is received (908). For example, with respect to FIG. 2, the tab 240 associated with a paid views segment can be selected.

Data is provided that cause an update to the view data graph to include data for an associated data segment (910). For example, as shown in FIG. 4, the tab 402 corresponding to the tab 240 has been selected, and the view data graph 406 is updated to include data (e.g., the data 408 and the data 410) for the paid views segment. As another example, the table 414 in the video content item area 412 can be updated to include data for the associated data segment.

Figure 10:
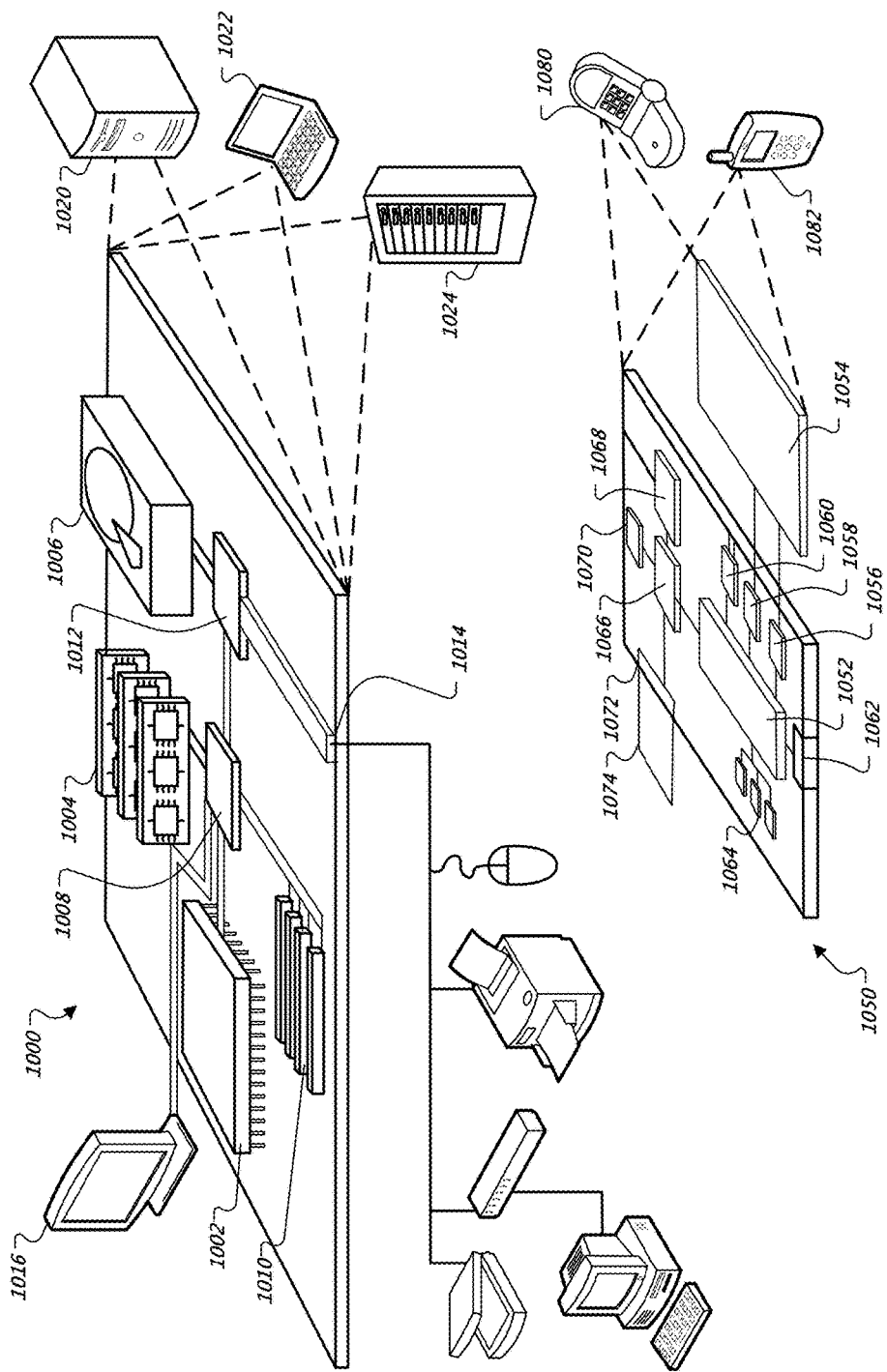
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can process instructions for execution within the computing device 1050, including instructions stored in the memory 1064. The processor may also include separate analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD display or an OLED display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication (e.g., via a docking procedure) or for wireless communication (e.g., via Bluetooth or other such technologies).

The memory 1064 stores information within the computing device 1050. In one implementation, the memory 1064 is a computer-readable medium. In one implementation, the memory 1064 is a volatile memory unit or units. In another implementation, the memory 1064 is a non-volatile memory unit or units. Expansion memory 1074 may also be provided and connected to device 1050 through expansion interface 1072, which may include, for example, a SIMM card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS receiver module 1070 may provide additional wireless data to device 1050, which may be used as appropriate by applications running on device 1050.

Device 1050 may also communication audibly using audio codec 1060, which may receive spoken information from a user and convert it to usable digital information. Audio codex 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
    causing, by a processor, presentation, on a user device, of a graphical user interface (GUI) that comprises a segmentation bar, a view data graph, and a video content item area, wherein the GUI corresponds to a plurality of video content items;
    in response to a first user selection, via the GUI, of a campaign associated with a subset of the plurality of video content items:
        identifying, by the processor, view data indicative of a number of views by a plurality of user devices of the subset of the plurality of video content items;
        identifying, by the processor, a plurality of segments of the view data, wherein a segment defines a portion of the view data in accordance with a filter criterion, wherein the view data comprises quartile view data for the subset of the plurality of video content items, wherein the quartile view data comprises a respective dwell time associated with a percentage of a respective video content item of the subset of the plurality of video content items that has been viewed;
        causing, by the processor, the GUI to be modified to display:
            via the view data graph, a first summary of the view data of the subset of the plurality of video content items; and
            via the video content item area, a listing of the subset of the plurality of video content items, the listing comprising respective names and a first table of quartile view data corresponding to the subset of the plurality of video content items;
    in response to a second user selection, via the segmentation bar, of one or more segments of the identified plurality of segments, causing, by the processor, the GUI to be modified to display a plurality of elements in the segmentation bar; and
    in response to a third user selection, via the video content item area, of a first video content item from the listing, causing, by the processor, the GUI to be modified to display:
        via the plurality of elements in the segmentation bar, annotations corresponding to a first portion of the view data corresponding to the first video content item;
        via the view data graph, a second summary of the first portion of the view data; and
        via the video content item area, a preview control comprising an image selected from a frame of the first video content item and a control for performing playback, responsive to user input, of at least a portion of the first video content item on the user device.

2. The method of claim 1, wherein the plurality of elements comprise tabs on the segmentation bar.

3. The method of claim 1, wherein the filter criterion enables filtering the view data by demographic segment.

4. The method of claim 1, wherein the filter criterion enables filtering the view data by location.

5. The method of claim 1, wherein the filter criterion enables filtering the view data by time.

6. The method of claim 1, wherein the plurality of elements comprises two or more elements associated with the identified segments.

7. The method of claim 1, wherein the listing comprises, for each of the subset of the plurality of video content items, a respective description.

8. The method of claim 1, wherein the first selection, the second selection, and the third selection are received from a content sponsor associated with the campaign, wherein the content sponsor is to evaluate performance of the subset of the plurality of videos via the GUI and edit the campaign.

9. The method of claim 1, wherein at least two of the plurality of elements correspond to segments comprising at least two of total views, organic views, views associated with an advertisement, views by a demographic segment, views by location, or views by time period.

10. A non-transitory computer-readable medium having instructions stored thereon that, in response to execution, cause a processor to perform operations comprising:
    causing presentation, on a user device, of a graphical user interface (GUI) that comprises a segmentation bar, a view data graph, and a video content item area, wherein the GUI corresponds to a plurality of video content items;
    in response to a first user selection, via the GUI, of a campaign associated with a subset of the plurality of video content items:
        identifying view data indicative of a number of views by a plurality of user devices of the subset of the plurality of video content items;
        identifying a plurality of segments of the view data, wherein a segment defines a portion of the view data in accordance with a filter criterion, wherein the view data comprises quartile view data for the subset of the plurality of video content items, wherein the quartile view data comprises a respective dwell time associated with a percentage of a respective video content item of the subset of the plurality of video content items that has been viewed;
        causing the GUI to be modified to display:
            via the view data graph, a first summary of the view data of the subset of the plurality of video content items; and
            via the video content item area, a listing of the subset of the plurality of video content items, the listing comprising respective names and a first table of quartile view data corresponding to the subset of the plurality of video content items;
    in response to a second user selection, via the segmentation bar, of one or more segments of the identified plurality of segments, causing, by the processor, the GUI to be modified to display a plurality of elements in the segmentation bar; and
    in response to a third user selection, via the video content item area, of a first video content item from the listing, causing, by the processor, the GUI to be modified to display:
        via the plurality of elements in the segmentation bar, annotations corresponding to a first portion of the view data corresponding to the first video content item;
        via the view data graph, a second summary of the first portion of the view data; and via the video content item area, a preview control comprising an image selected from a frame of the first video content item and a control for performing playback, responsive to user input, of at least a portion of the first video content item on the user device.

11. A system comprising:
a memory; and
a processor, coupled to the memory, to:
  cause presentation, on a user device, of a graphical user interface (GUI) that comprises a segmentation bar, a view data graph, and a video content item area, wherein the GUI corresponds to a plurality of video content items;
  in response to a first user selection, via the GUI, of a campaign associated with a subset of the plurality of video content items:
    identify view data indicative of a number of views by one or more user devices of the subset of the plurality of video content items;
    identify a plurality of segments of the view data, wherein a segment defines a portion of the view data in accordance with a filter criterion, wherein the view data comprises quartile view data for the subset of the plurality of video content items, wherein the quartile view data comprises a respective dwell time associated with a percentage of a respective video content item of the subset of the plurality of video content items that has been viewed;
    cause the GUI to be modified to display:
      via the view data graph, a first summary of the view data of the subset of the plurality of video content items; and
      via the video content item area, a listing of the subset of the plurality of video content items, the listing comprising respective names and a first table of quartile view data corresponding to the subset of the plurality of video content items;
  in response to a second user selection, via the segmentation bar, of one or more segments of the identified plurality of segments, cause the GUI to be modified to display a plurality of elements in the segmentation bar; and
  in response to a third user selection, via the video content item area, of a first video content item from the listing, cause the GUI to be modified to display:
    via the plurality of elements in the segmentation bar, annotations corresponding to a first portion of the view data corresponding to the first video content item;
    via the view data graph, a second summary of the first portion of the view data; and
    via the video content item area, a preview control comprising an image selected from a frame of the first video content item and a control for performing playback, responsive to user input, of at least a portion of the first video content item on the user device.

12. The method of claim 1, wherein in response to the third selection, the GUI is to further display, via the video content item area, a second table of quartile view data corresponding to the first video content item.

13. The method of claim 1 further comprising, in response to a fourth user selection, via the segmentation bar, of a paid views element of the plurality of elements, causing, by the processor, the GUI to be modified to display:
  a third summary, via the view data graph, of second portions of the view data corresponding to paid views and non-paid views of the first video content item; and
  a third table, via the video content item area, of second quartile view data corresponding to the paid views and the non-paid views of the first video content item.

14. The method of claim 13 further comprising, in response to a fifth user selection, via the segmentation bar, of a views-played-to element of the plurality of elements, causing, by the processor, the GUI to be modified to display:
  a fourth summary, via the view data graph, of third quartile view data corresponding to the non-paid views and subsets of the paid views of the first video content item; and
  a fourth table, via the video content item area, of the third quartile view data.

15. The method of claim 8, wherein the campaign is created by the content sponsor, wherein the content sponsor is a content provider.

16. The method of claim 8, wherein the content sponsor is a campaign sponsor.

17. The method of claim 1 further comprising:
  receiving the first user selection;
  receiving the second user selection subsequent to the receiving of the first user selection; and
  receiving the third user selection subsequent to the receiving of the second user selection.

18. The method of claim 1, wherein the causing of the GUI to be modified in response to the first selection is prior to the causing of the GUI to be modified in response to the second selection, wherein the causing of the GUI to be modified in response to the third selection is subsequent to the causing of the GUI to be modified in response to the second selection.

19. The method of claim 1, wherein the listing comprises, for each of the subset of the plurality of video content items, a respective preview control comprising a respective image selected from a respective frame of a corresponding video content item and a control for performing playback of at least a portion of the corresponding video content item on the user device responsive to a respective user input.

* * * * *